(12) United States Patent
Kemp et al.

(10) Patent No.: US 10,181,706 B2
(45) Date of Patent: Jan. 15, 2019

(54) METHODS FOR REMOVAL OF COMPONENTS OF A SUBSEA OILFIELD FACILITY

(71) Applicant: Chevron U.S.A. Inc., San Ramon, CA (US)

(72) Inventors: Ian Paul Kemp, Perth (AU); David Glynn Thomas, Perth (AU); Ursula Louise Benson, Perth (AU)

(73) Assignee: CHEVRON U.S.A. INC., San Ramon, CA (US)

( * ) Notice: Subject to any disclaimer, the term of this patent is extended or adjusted under 35 U.S.C. 154(b) by 69 days.

(21) Appl. No.: 15/473,268

(22) Filed: Mar. 29, 2017

(65) Prior Publication Data

US 2017/0264086 A1  Sep. 14, 2017

Related U.S. Application Data

(60) Provisional application No. 62/306,701, filed on Mar. 11, 2016.

(51) Int. Cl.
*H02G 1/08* (2006.01)
*H02G 1/10* (2006.01)
*E21B 29/02* (2006.01)
*F16L 1/16* (2006.01)

(52) U.S. Cl.
CPC .............. *H02G 1/08* (2013.01); *E21B 29/02* (2013.01); *H02G 1/10* (2013.01); *F16L 1/16* (2013.01)

(58) Field of Classification Search
CPC .. H02G 1/08; H02G 1/10; E21B 29/02; F16L 1/16
See application file for complete search history.

(56) References Cited

U.S. PATENT DOCUMENTS

| | | | | |
|---|---|---|---|---|
| 4,090,170 | A * | 5/1978 | Lincklaen-Arriens | C23F 13/04 307/95 |
| 5,031,290 | A * | 7/1991 | Brereton | C23F 13/02 204/196.3 |
| 6,069,334 | A * | 5/2000 | Capitanescu | B23K 9/04 219/123 |
| 6,278,095 | B1 * | 8/2001 | Bass | F16L 53/004 166/248 |
| 6,278,096 | B1 * | 8/2001 | Bass | B29C 45/14336 219/629 |
| 6,965,320 | B1 * | 11/2005 | Casey | F16L 55/48 324/71.2 |
| 8,555,961 | B2 * | 10/2013 | Koloy | E21B 33/1216 166/179 |

(Continued)

*Primary Examiner* — Benjamin F Fiorello
(74) *Attorney, Agent, or Firm* — Karen R. DiDomenicis

(57) ABSTRACT

Disclosed are processes for removing carbon steel components of a subsea oilfield facility in a subsea environment by accelerating the corrosion of the carbon steel components in the surrounding seawater, by a passive and/or active impressed current method. In the passive method, the facility is connected to a cathodic metal of greater electrical potential, such as copper. In order to cause the maximum and uniform corrosion, it is preferred that a wire of the chosen cathodic metal be extended along the facility and through pipelines. In the active impressed current method, an external DC electrical supply is used to apply an electrical potential difference between the steel components of the facility and the cathodic metal.

16 Claims, 5 Drawing Sheets

(56) References Cited

U.S. PATENT DOCUMENTS

| | | | |
|---|---|---|---|
| 2003/0015436 A1* | 1/2003 | Bass | C23F 13/02 205/740 |
| 2005/0054228 A1* | 3/2005 | March | F16L 9/18 439/191 |
| 2008/0160236 A1* | 7/2008 | Lockwood | B32B 1/08 428/34.7 |

* cited by examiner

METHODS FOR REMOVAL OF COMPONENTS OF A SUBSEA OILFIELD FACILITY

FIELD

The present disclosure relates to methods for removing a component of a subsea oilfield facility.

BACKGROUND

The abandonment or decommissioning of a subsea oil field facility including the removal of facility components such as pipeline can be very expensive and must be managed carefully to avoid environmental damage. The removal of carbon steel pipes and jackets below the mud line is an onerous, costly process including excavation, cutting and physical removal of the components. There exists a need for a method for removing subsea components in a simpler, less costly way.

SUMMARY

In one aspect, a process is provided for the removal of a component of a subsea oilfield facility located in a subsea environment. The component is at least partially formed from a corrodible metal. The component is at least partially surrounded by seawater. The process includes establishing electrical connection between the component and a conductive material. As a result of the electrical connection, the component is corroded at an accelerated rate.

DESCRIPTION OF THE DRAWINGS

These and other objects, features and advantages of the present invention will become better understood with reference to the following description, appended claims and accompanying drawings. The drawings are not considered limiting of the scope of the appended claims. The elements shown in the drawings are not necessarily to scale. Reference numerals designate like or corresponding, but not necessarily identical, elements.

DETAILED DESCRIPTION

Figure 1:
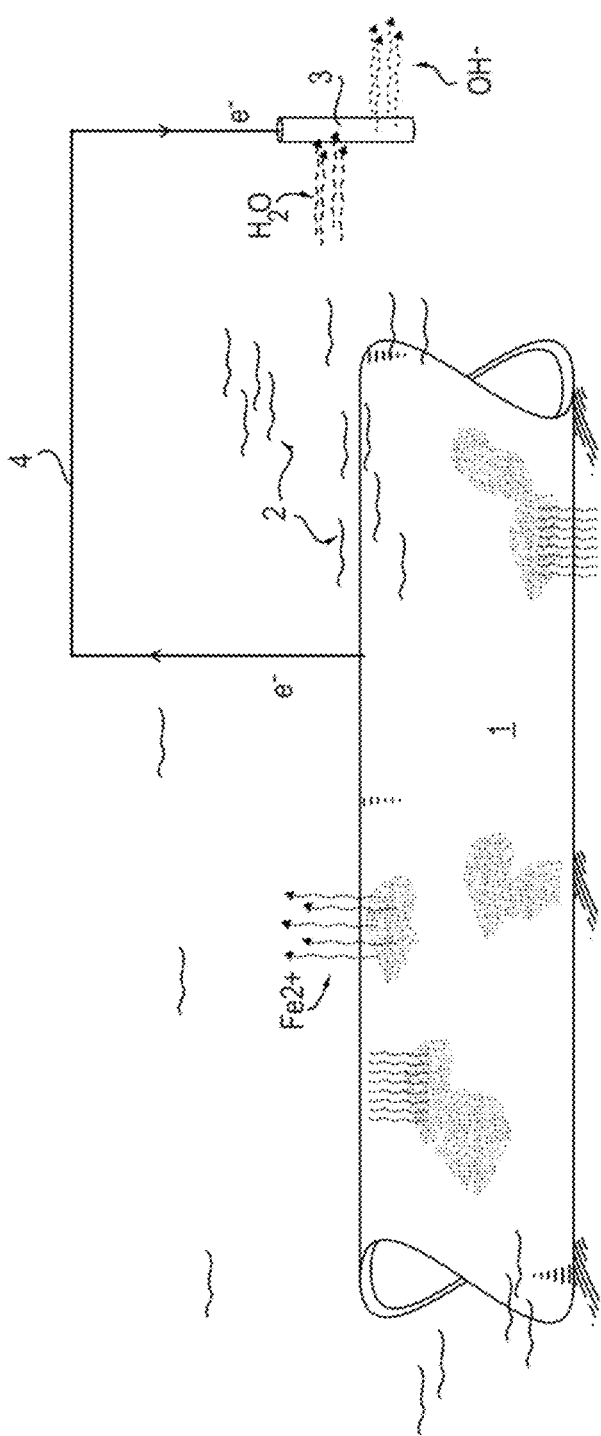
FIG. 1 is a schematic diagram illustrating a process according to one embodiment.

A process useful for the removal of a component of an oilfield facility in a subsea environment will now be described with reference to FIG. 1. The component 1 is at least partially formed from a corrodible metal and is surrounded by seawater 2 at a subsea location. In some embodiments, the corrodible metal can be alloy steel or carbon steel.

Electrical connection is established between the component 1 and a conductive material, also referred to herein as a second metal and an electrode 3. In one embodiment, electrical connection is established by connecting the component 1 with the conductive material 3 using a conductor 4 through which electrons may flow from the component 1 to the electrode 3. The conductor 4 can be any conductive cable or wire. As a result of the electrical connection, the component 1 is corroded at an accelerated rate. In one embodiment, at least a portion of the component 1 is corroded to form one or more metal oxides. In one embodiment, at least a portion of the component 1 is corroded to form one or more iron oxides.

In one embodiment, the second metal of the electrode 3 has an electrical potential greater than the electrical potential of the corrodible metal of the component 1. This is also referred to as the "passive" scenario. In the passive embodiment, the second metal contains a more noble metal than the metal of the component 1. The electrode 3 has a higher, less negative, electrical potential than that of the pipeline 1. In one embodiment, the second metal contains copper.

The form that the electrode 3 takes can be one that ensures high surface area. In one embodiment, the electrode 3 can be highly porous. In one embodiment, the electrode 3 is surrounded by seawater 2 at all times during the process. In an alternate embodiment, the electrode 3 is in partial contact with seawater 2 at all times during the process. The conductor 4 can be fully submerged in the water. In another embodiment, the conductor 4 leaves the surface of the seawater 2 and passes through the air over a portion of the length thereof.

In one embodiment, the electrical connection is maintained continuously for sufficient time to allow the component 1 to corrode significantly, i.e., sufficiently to facilitate the removal of the component 1. The driving force for the corrosion is the difference in electrical potential between the component 1 and the electrode 3, driving current from the component 1 to the electrode 3 through the conductor 4. The amount of corrosion will result in significantly reduced strength, and will be accompanied by a change in appearance. In one embodiment, the electrical connection can be maintained for up to about 10 years. In one embodiment, the electrical connection is maintained for between about 1 year and about 10 years.

In one embodiment, subsequent to the significant corrosion, the process further includes breaking the component 1 into a plurality of pieces, i.e. two or more, to facilitate the removal of the component 1 from the subsea location. In such case, if the component 1 is a pipeline 1, breaking the pipeline 1 into pieces which are half the size or less of the original pipeline 1 can greatly reduce the cost of removing the pipeline 1.

In another embodiment, the component 1 is degraded so extensively that physical removal of the component 1 is not required. In such case, the component 1 is transformed to metal oxides or rust which may include hydrated iron(III) oxides $Fe_2O_3 \cdot nH_2O$ and iron(III) oxide-hydroxide (FeO(OH) and $Fe(OH)_3$). The metal oxides are in the form of brittle flakes which are weak and fall apart readily.

In one embodiment, the electrical connection is established between the second metal of the electrode 3 and the component 1 over a limited, concentrated area or areas of the component 1 so that the concentrated area(s) of the component 1 becomes corroded at an accelerated rate as compared to other areas of the component 1. The concentrated area(s) are then significantly weakened, thus facilitating breaking of the component 1 into pieces.

In one embodiment, a first portion of the component 1 has an electric connection with the electrode 3, and a second portion of the component 1 does not have an electric connection with the electrode 3. In such case, the first (connected) portion of the component 1 will be subject to accelerated corrosion as compared with the second (unconnected) portion. Upon accelerated corrosion, the first portion of the component 1 will therefore have an increased porosity and an increased surface area as compared with the porosity and a surface area of the second portion of the component 1, i.e., the portion not having an electric connection with the second metal.

In another embodiment, the electrical connection is maintained intermittently rather than continuously for sufficient time to allow the component 1 to corrode sufficiently to facilitate the removal of the component 1.

Figure 2A:
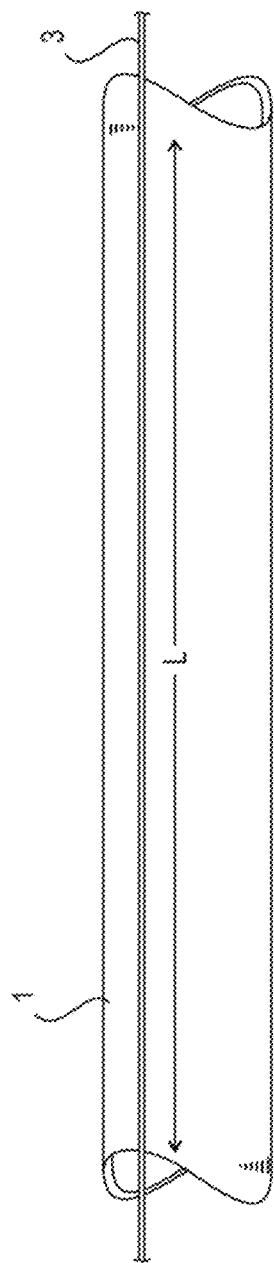
FIGS. 2A-D are schematic diagrams illustrating additional embodiments.

Referring now to a simplified illustration in FIG. 2A, in one embodiment, the component 1 can include a pipeline 1 having a length L. In one embodiment, the electrode 3 can take the form of a wire 3 comprising the second metal and extending along the length L of the pipeline 1. The wire 3 makes at least partial contact with the pipeline 1, thus establishing electrical connection with the pipeline 1. In one embodiment, the wire 3 makes contact substantially along the length of the wire 3 with the pipeline 1.

Figure 2B:
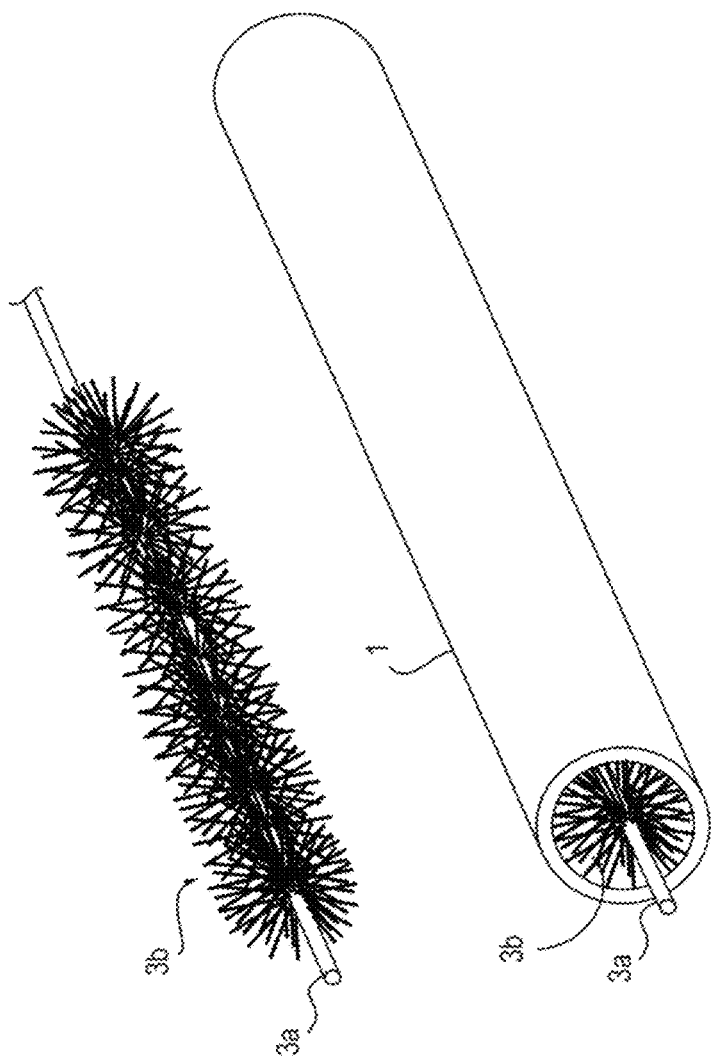

As shown in FIG. 2B, the wire 3a can extend along a central axis of the pipeline 1 along at least a portion of the length of the pipeline. The wire 3a can further include radially extending conductive filaments 3b to centralize the wire 3a within the pipeline 1. The radially extending conductive filaments 3b make contact with the walls of the pipeline 1.

Figure 2C:
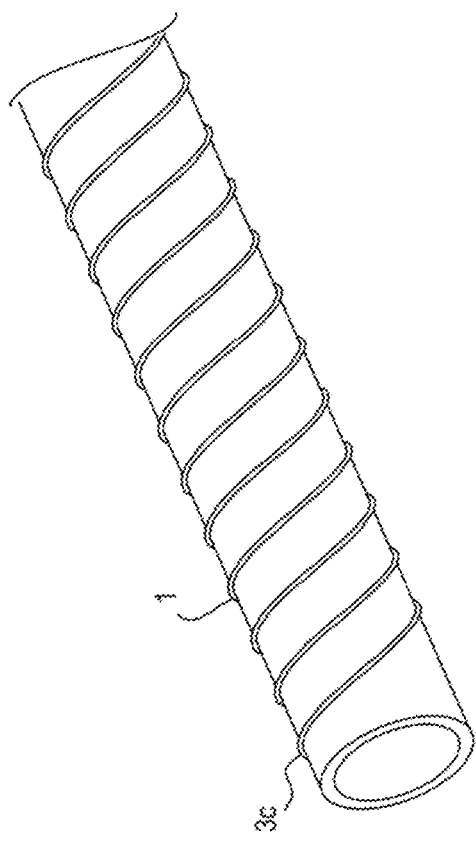

In another embodiment, illustrated in FIG. 2C, the electrode 3 can take the form of a wire 3c wrapped around and in contact with the pipeline 1.

Figure 2D:
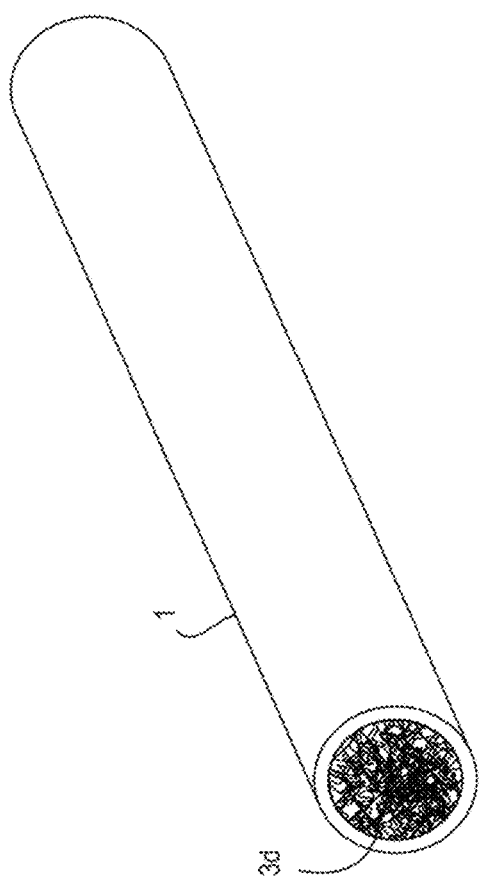

In another embodiment, illustrated in FIG. 2D, the electrode 3 can take the form of a three-dimensional form 3d. The three-dimensional form 3d can be inserted within the pipeline 1, such that the three-dimensional form 3d contacts an inner surface of the pipeline 1, thus establishing electrical connection with the pipeline 1. The three-dimensional form 3d can be a mesh or a cylindrical shape. In one embodiment, the three-dimensional form 3d is inserted within the pipeline 1 with the use of a pig capable of moving through the pipeline 1.

Figure 3:
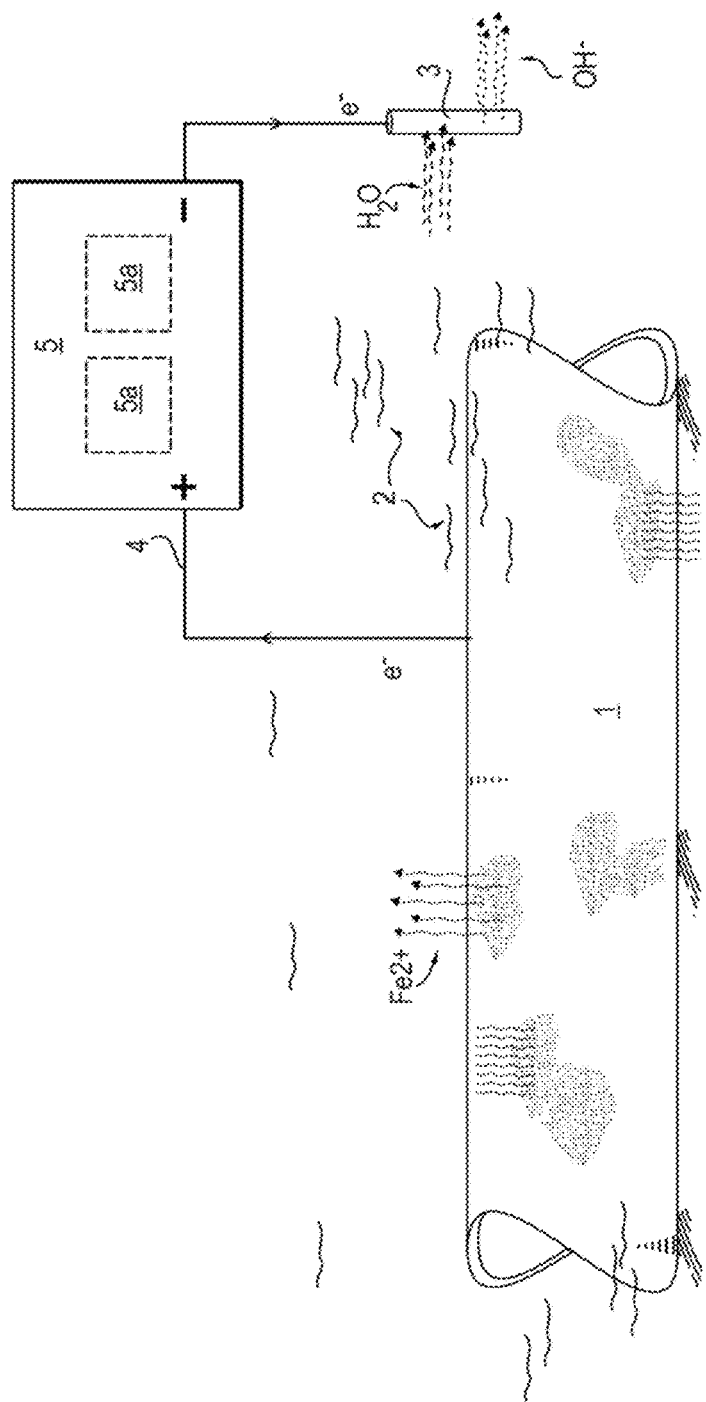
FIG. 3 is a schematic diagram illustrating a process according to yet another embodiment.

Referring to FIG. 3, in some embodiments, a DC power supply 5 is used to drive current from the component 1 to the electrode 3. This is also referred to as the "impressed current" scenario. The power supply 5 is located above the waterline at a topside location, such as on a platform or vessel (not shown). The component 1 is connected to the direct current power source 5, thereby increasing the electrical potential difference between the component 1 and the electrode 3. In the impressed current embodiments, the metal of the electrode 3 can be any metal. In one embodiment, the electrode 3 is a structural component such as, for instance, the leg of a rig or a platform (not shown). The impressed current simultaneously protects the rig or platform and accelerates the destruction of the pipeline 1.

The current provided by the power supply 5 can be applied intermittently or pulsed at a predetermined frequency over time. This can be advantageous to help ensure that the corrosion rate of component 1 occurs rapidly.

The direct current power source can be any suitable power source, including, but not limited to, a DC power supply 5, or, alternatively, a rectifier 5a connected to an alternating current power supply 5b. The alternating current power supply 5b can include a solar cell, a wind turbine, a tidal generator or a gas powered generator. In embodiments where the power source is intermittently available, for instance, where the power source is solar, wind or tidal activity, current can be applied only when power is available, thereby pulsing the current over time.

Although in impressed current embodiments, i.e., when a direct current power source is used to accelerate corrosion, higher levels of voltage and power will result in faster degradation, voltage and power levels will be practically limited by what can be safely handled and applied. In some embodiments, current and voltage applied can be no more than a few hundred amps and no more than 100 V DC, respectively. In some embodiments, current and voltage applied can be on the order of 50 A and 50 V DC, respectively.

In some embodiments, having a low voltage DC current applied to component 1 in temperate waters results in the attraction of coral-growing organisms to the current-bearing infrastructure. This may have advantages beyond the degradation of the component 1 in that natural subsea habitat formation is accelerated.

It should be noted that only the components relevant to the disclosure are shown in the figures, and that many other components normally part of a subsea oilfield facility are not shown for simplicity.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

From the above description, those skilled in the art will perceive improvements, changes and modifications, which are intended to be covered by the appended claims.

What is claimed is:

1. A process for removal of a component of a subsea oilfield facility located in a subsea environment wherein the component comprises a corrodible metal pipeline having a length and is surrounded by seawater, comprising:
   establishing electrical connection between the component and a second metal comprising a conductive material in the form of a wire comprising the second metal; wherein the wire extends along a central axis of the pipeline along the length of the pipeline and further comprises radially extending filaments to centralize the wire within the pipeline; such that the component is corroded at an accelerated rate.

2. A process for removal of a component of a subsea oilfield facility located in a subsea environment wherein the component comprises a corrodible metal and is surrounded by seawater, comprising:

establishing electrical connection between the component and a second metal comprising a conductive material;

connecting the component to a direct current power source selected from the group consisting of a rectifier connected to a solar cell, wind generated electricity, and electricity generated from tidal activity, thereby increasing the electrical potential difference between the components and the second metal; and applying current when power is available thereby pulsing the current over time;

such that the component is corroded at an accelerated rate.

3. A process for removal of a component of a subsea oilfield facility located in a subsea environment wherein the component comprises a corrodible metal and is surrounded by seawater, comprising:

establishing electrical connection between the component and a second metal comprising a conductive material; and connecting the component to a direct current power source selected from the group consisting of a rectifier connected to an alternating current power supply, a solar cell, wind generated electricity, electricity generated from tidal activity and gas power, thereby increasing the electrical potential difference between the components and the second metal;

such that the component is corroded at an accelerated rate.

4. The process of any of claim 3, 1 or 2, wherein the electrical connection is established between the second metal and the component over a concentrated area of the component such that the concentrated area of the component is corroded at an accelerated rate; and further comprising breaking the component into a plurality of pieces to facilitate the removal of the component.

5. The process of any of claim 3, 1 or 2, wherein the electrical connection is maintained for up to about 10 years.

6. The process of any of claim 3, 1 or 2, wherein the electrical connection is maintained for between about 1 year and about 10 years.

7. The process of any of claim 3, 1 or 2, wherein the second metal has an electrical potential greater than an electrical potential of the corrodible metal.

8. The process of any of claim 3, 1 or 2, wherein the second metal comprises copper.

9. The process of any of claim 3, 1 or 2, wherein the component comprises a corrodible metal selected from alloy steels and carbon steels.

10. The process of claim 9, wherein at least a portion of the component is corroded to form one or more iron oxides.

11. The process of claim 3 or claim 2, wherein the component comprises a pipeline having a length; and wherein the second metal is in the form of a wire comprising the second metal and extending along the length of the pipeline.

12. The process of claim 11, wherein the wire is wrapped around the pipeline.

13. The process of claim 11, wherein the wire is inserted within the pipeline and wherein the wire has a three-dimensional form such that the wire contacts an inner surface of the pipeline.

14. The process of any of claim 3, 1 or 2, wherein at least a portion of the component is corroded to form one or more metal oxides.

15. The process of claim 14, wherein a portion of the component does not have an electric connection with the second metal; and the corroded portion of the component has an increased porosity and an increased surface area as compared with a porosity and a surface area of the portion of the component not having an electric connection with the second metal.

16. The process of claim 3 or claim 2, further comprising applying current at a predetermined frequency thereby pulsing the current over time.

* * * * *

UNITED STATES PATENT AND TRADEMARK OFFICE
CERTIFICATE OF CORRECTION

PATENT NO. : 10,181,706 B2  
APPLICATION NO. : 15/473268  
DATED : January 15, 2019  
INVENTOR(S) : Ian Paul Kemp, David Glynn Thomas and Ursula Louise Benson Page 1 of 1

It is certified that error appears in the above-identified patent and that said Letters Patent is hereby corrected as shown below:

On the Title Page

Item (73), should read:  
CHEVRON AUSTRALIA PTY. LTD.,

Signed and Sealed this  
Ninth Day of April, 2019

Andrei Iancu  
*Director of the United States Patent and Trademark Office*